United States Patent [19]
Radhakrishnan et al.

[11] Patent Number: 5,751,697
[45] Date of Patent: May 12, 1998

[54] ALLOWED CELL RATE RECIPROCAL APPROXIMATION IN RATE-BASED AVAILABLE BIT RATE SCHEDULERS

[75] Inventors: Sivakumar Radhakrishnan, Burnaby; Stephen J. Dabecki, Coquitlam, both of Canada

[73] Assignee: PMC-Sierra, Inc., Burnaby, Canada

[21] Appl. No.: 568,347

[22] Filed: Dec. 6, 1995

[51] Int. Cl.$^6$ .............................. H04L 12/24; G06F 1/02
[52] U.S. Cl. ..................... 370/229; 364/765; 370/905
[58] Field of Search ................... 370/232, 234, 370/233, 230, 235, 236, 231, 229, 905; 364/765

[56] References Cited

U.S. PATENT DOCUMENTS

| | | |
|---|---|---|
| 4,463,380 | 7/1984 | Hooks ........................... 358/160 |
| 5,515,359 | 5/1996 | Zheng ............................ 370/13 |

OTHER PUBLICATIONS

Walter Rudin, Principles of Mathematical Analysis, McGraw Hill,3rd ed., p. 201, 1976.

*Primary Examiner*—Douglas W. Olms
*Assistant Examiner*—Matthew C. Phillips
*Attorney, Agent, or Firm*—Oyen Wiggs Green & Mutala

[57] ABSTRACT

A method of scheduling cell transmission over an asynchronous transfer mode communication channel. The channel has a characteristic transmission rate that is related to the system clock frequency $f$ and an allowed cell rate ACR expressed as a floating point number having a mantissa m, and an exponent e, where $0 \leq m \leq 511$, $0 \leq e \leq 31$ and ACR= $(1+m/512)*2^e$. If $m \geq 128$ then the reciprocal of the mantissa portion (1+m/512) is evaluated by piece-wise linear approximation of the function:

$$\frac{1}{2}\left(1 + \frac{512-m}{1024} + 1.5\left(\frac{512-m}{1024}\right)^2\right)$$

Otherwise, if m<128 then the mantissa portion is evaluated by piece-wise linear approximation of the function:

$$\left(1 - \frac{m}{512} + \left(\frac{m}{512}\right)^2\right)$$

A selected cell is then scheduled for transmission at a time T relative to the transmission time $T_0$ of a cell transmitted immediately prior to the selected cell, where $T=T_0+(ACR^{-1})*f$. A hardware embodiment of the invention, requiring only one 9-bit two's complementer, three 11-bit adders, and glue logic for multiplexing/control is easily implemented using VLSI circuitry in compliance with ATM Forum traffic management standards, without resort to hardware division or multiplication.

5 Claims, 17 Drawing Sheets b) m > 64

4x        10    11-bits    0
m
m/2

$-68|_{10} = 1980|_{10}$

```
*** **** **** ** 00    A
  *   * **** **** +
                       B
*** **** **** **** 
111 1011 1100          . *
                       Cin
```

```
*** **** **** ****     sum1
*** **** **** ****  +  sum2
```

*   **  Result

A + B = sum1
C + D = sum2
Result = sum1 + sum2

C
D +

FIG. 11B c) $m \leq 64$

```
       10    11-bits    0
4x    ***  **** ** 00
m/2   ***  **** ****
                  .*  ← sum1
                  Cin   sum2 +
      _____
Result *** **** ****
```

Result = sum1 + sum2

If Result=0, then reciprocal is to be interpreted as 1

FIG. 11C a) x >256

```
     10   11-bits    0
 2x  0** ****'*** **** 0           Discard
 x/8            ** **** ****         A +
                                     B
                                      ↓
                                    (****
                                     ***.)

*** **** ****  sum1
      011 0011 0111  sum2
 823|₁₀              +

*** **** ****  Result
```

A + B = sum1
    Result = sum1 + sum2

FIG. 12A b) x >128 x/2+3/8*(x mod 2)
x/16

$9701_{10}$
x

```
     ┌─────────────┐  A
     │**** **** ·*x₀x₀│ +
     │  *,**** · ****│  B
     └─────────────┘  *Cin

⎛···⎞ ****        sum1
    ⎝+  ⎠ ****    ← Discard
  111 1100 1010  ****  C
  *** **** ****  ****  +
                       D

****  ****  ****    sum1
    ****  ****  ****  +
    ****  ****  ****    sum2

***  ****  ****      Result
```

A + B = sum1
C + D = sum2
Result = sum1 + sum2

FIG. 12B

Offset adjustment (Note: $m\%2(x\%2)$ denotes modulo 2 operation)

| Range | Minimum @m= | function Difference (f_app - f_ideal) | Adjustment Factor (upto 12-bit precision) |
|---|---|---|---|
| $65 \leq m \leq 96$ | 65 | 0.0020559433 | $\Delta_1 = -\dfrac{1}{512}$ |
| $97 \leq m \leq 127$ | 97 | 0.0096193098 | $\Delta_2 = -\left(\dfrac{5}{512}\right) + \left(\dfrac{m\%2}{4096}\right)$ |
| $257 \leq x \leq 384$ ($255 \leq m \leq 128$) | 128 | 0.0046875000 | $\Delta_3 = -\dfrac{3}{4}\left(\dfrac{12}{2048}\right)$ |
| $129 \leq x \leq 256$ ($383 \leq m \leq 256$) | 383 | 0.0029146503 | $\Delta_4 = -\dfrac{3}{4}\left(\dfrac{1}{256}\right) + \dfrac{3}{4}\left(\dfrac{x\%2}{4096}\right)$ |

FIG. 13

ALLOWED CELL RATE RECIPROCAL APPROXIMATION IN RATE-BASED AVAILABLE BIT RATE SCHEDULERS

FIELD OF THE INVENTION

This application is directed to a novel circuit for computing the reciprocal $ACR^{-1}$ of an Allowed Cell Rate (ACR). $ACR^{-1}$ is an important parameter in the design of an Asynchronous Transfer Mode (ATM) network incorporating Available Bit Rate (ABR) service.

BACKGROUND OF THE INVENTION

The term ACR is usually expressed as a floating point number (9-bit mantissa and 5-bit exponent) as defined by the ATM Forum. The reciprocal of ACR is of significant importance in the design of an ABR scheduler. The present invention applies the binomial theorem and quadratic approximation techniques to derive equations which are easily implemented in hardware without requiring division or multiplication. Accuracy in excess of 99% is attained for an 11-bit mantissa representation.

SUMMARY OF THE INVENTION

In accordance with the preferred embodiment, the invention provides a method of scheduling cell transmission over an asynchronous transfer mode communication channel. The channel has a given transmission rate that is related to the system clock frequency $f$ and an allowed cell rate ACR expressed as a floating point number having a mantissa m and an exponent e, where $0 \leq m \leq 511$ and $0 \leq e \leq 31$ such that $ACR = (1+m/512)*2^e$. The reciprocal of ACR is then given as $ACR^{-1} = 1/(1+m/512)*2^{-e}$. Observe that the negative exponent can be calculated implicitly and hence the problem reduces to evaluating the reciprocal of the mantissa portion: $1/(1+m/512)$. If $m \geq 128$ then such portion is evaluated by piece-wise linear approximation of the function:

$$\frac{1}{2}\left(1 + \frac{512-m}{1024} + 1.5\left(\frac{512-m}{1024}\right)^2\right)$$

Otherwise, if $m \leq 128$ then the reciprocal of the mantissa portion is evaluated by piece-wise linear approximation of the function:

$$\left(1 - \frac{m}{512} + \left(\frac{m}{512}\right)^2\right)$$

A selected cell is then scheduled for transmission at a time T relative to the transmission time To of a cell transmitted immediately prior to the selected cell, where $$T = T_0 + (ACR^{-1})*f.$$

The invention further provides apparatus for approximating the reciprocal $ACR^{-1}$ of an allowed cell rate ACR expressed as a floating point number having a mantissa m and an exponent e, where $0 \leq m \leq 511$ and $0 \leq e \leq 31$ such that $ACR = (1+m/512)*2^e$. The apparatus incorporates a two's complementer for receiving a binary representation of the mantissa m and for producing a two's complement representation thereof, a first adder for receiving first and second binary representations of selected functions of the two's complement representation of the mantissa m and for producing a first binary summation representation thereof, a second adder for receiving third and fourth binary representations of selected constants or selected functions of the two's complement representation of the mantissa m and for producing a second binary summation representation thereof, and a third adder for determining the reciprocal $ACR^{-1}$ as a binary summation representation of the first and second summation representations.

BRIEF DESCRIPTION OF THE DRAWINGS

FIGS. 12(a), 12(b) and 12(c) respectively depict bit groupings utilized in the hardware unit of FIG. 10 during determination of $ACR^{-1}$ for values of $m \geq 128$, where: $256<(512-m)$; $128<(512-m)<256$; and, $(512-m) \leq 128$.

FIG. 13 tabulates offset adjustments used in refining the mathematical model renderings shown in FIG. 7.

DETAILED DESCRIPTION OF THE PREFERRED EMBODIMENT

Figure 1:
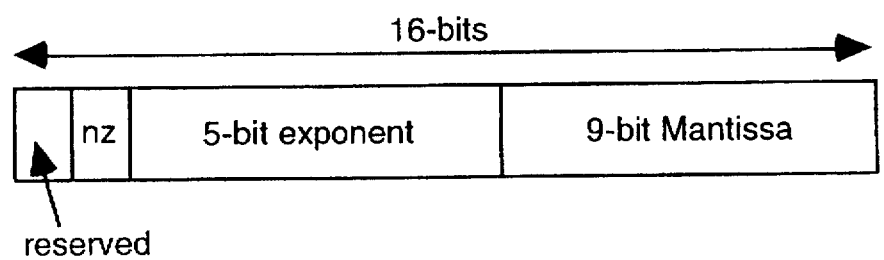
FIG. 1 schematically shows an Allowed Cell Rate (ACR) expressed as a 14-bit floating point number packed in a 16-bit word.

An ABR scheduler implemented in accordance with the ATM Forum Traffic Management Specification (ATM Forum/94-0849 and 95-0013R8) requires calculation of the reciprocal of ACR in order to schedule a cell belonging to a particular Virtual Circuit (VC) in the next available time slot. The parameter ACR is expressed as a 14-bit floating point number given by $$ACR = \left(1 + \frac{m}{512}\right) 2^e$$

where $0 \leq e \leq 31$, $0 \leq m \leq 511$ and $nz = \{0, 1\}$ are packed in a 16-bit word as shown schematically shown in FIG. 1. Note that if $nz=0$, then ACR is 0. Otherwise, ACR is a floating point number dictated by the values of m and e. The reciprocal of ACR is given by $$ACR^{-1} = \frac{1}{ACR} = \frac{1}{\left(1 + \frac{m}{512}\right)} 2^{-e} \qquad (1)$$

In order to evaluate $ACR^{-1}$ with a reasonable degree of accuracy, Equation (1) must be analyzed to select an ideal representative length for the reciprocal. If the size of the reciprocal is restricted to 2 bytes, as is practical from an implementation standpoint, then, for maximum efficiency, $ACR^{-1}$ may be expressed as a floating point number having an 11-bit mantissa and a 5-bit exponent. The fact that the exponent is negative ($2^{-e}$) is implicitly conveyed.

Mathematical Basis

Instead of using a dedicated floating point division unit to perform brute force calculation of $ACR^{-1}$, which would be expensive both in terms of hardware cost and evaluation time, an alternative solution is derived by analyzing Equation (I), as will now be discussed.

The binomical theorem can be used to express some fractions as an infinite series. Consider the following expansions:

$$\frac{1}{1+\Delta} = 1 - \Delta + \Delta^2 - \Delta^3 \ldots \pm \Delta^\infty \qquad (2)$$

$$\frac{1}{1-\Delta} = 1 + \Delta + \Delta^2 + \Delta^3 \ldots + \Delta^\infty \qquad (3)$$

where $\Delta \ll 1$. The smaller the value of $\Delta$, the better will be the accuracy. For the problem at hand, $$\Delta = \frac{m}{512}.$$

Hence $ACR^{-1}$ is expressed, using Equation (2), as:

$$f = \frac{1}{1 + \frac{m}{512}} = 1 - \frac{m}{512} + \left(\frac{m}{512}\right)^2 - \left(\frac{m}{512}\right)^3 + \qquad (4)$$

$$\left(\frac{m}{512}\right)^4 - \ldots \pm \left(\frac{m}{512}\right)^\infty$$

$$= 1 - \frac{m}{512} + \left(\frac{m}{512}\right)^2 \left(1 - \frac{m}{512}\right) + \qquad (5)$$

$$\left(\frac{m}{512}\right)^3 \left(1 - \frac{m}{512}\right) + \ldots$$

$$= 1 - \frac{m}{512} + \left(\frac{m}{512}\right)^2 \left(\frac{1}{1 + \frac{m}{512}}\right)$$

$$\leq 1 - \frac{m}{512} + \left(\frac{m}{512}\right)^2 \qquad (6)$$

Thus, $ACR^{-1}$ is bounded from above by Equation (6) and involves the computation of second order terms. Examination of Equation (6) reveals that the function value $f$ ranges from 1 to $$\frac{1}{2}$$

as m varies from 0 to 511; and, that as $m \to 511$, the error induced by the approximation increases gradually. As is hereinafter explained, Equation (4) can be manipulated to reduce this error for higher values of m.

Analysis

Figure 2:
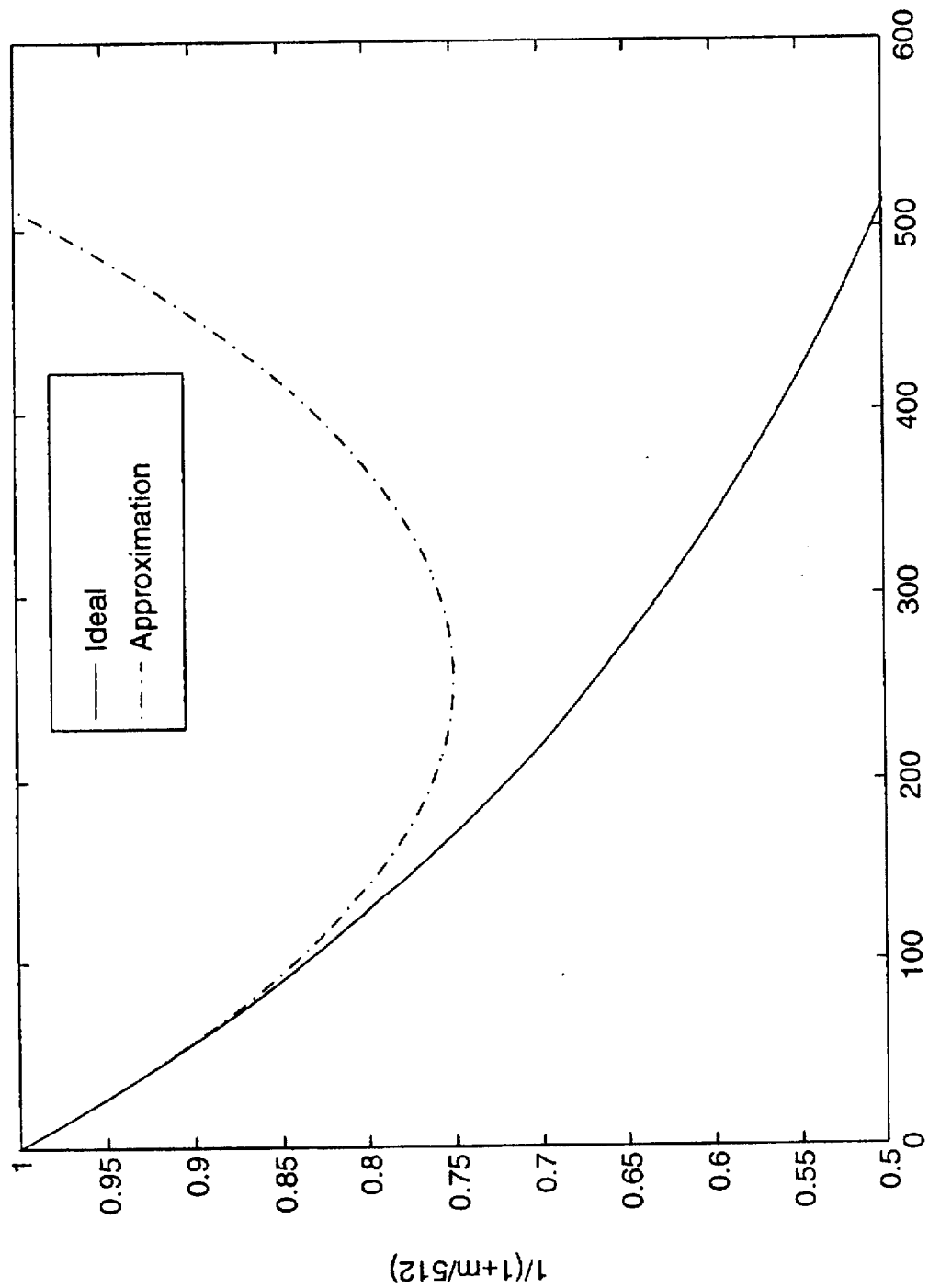
FIG. 2 is a graphical representation of ideal (solid line) and approximated (dashed line) values of $ACR^{-1}$, with $1/(1+m/512)$ plotted as the ordinate and m plotted as the abscissa.

FIG. 2 shows the ideal value of $ACR^{-1}$ (solid line) and the approximation given by Equation (6) (dashed line). FIG. 2 clearly shows that the approximation deviates considerably with increasing values of m. Preferably, the formula should be modified to accommodate larger values of m in order to reduce the accumulated error. m=128 is a suitable cut-off value, because 128 is a power of 2; and because the error at m=128 is 0.0125 (or 1.56% deviation from the ideal) which is acceptable. Hence, any value of m>128 will have a larger error. Re-expressing Equation (4), yields:

$$f = \frac{1}{1 + \frac{m}{512}} = \frac{1}{1 + \frac{(512-x)}{512}} = \frac{1}{2}\left(1 - \frac{x}{1024}\right)^{-1} \qquad (7)$$

$$= \frac{1}{2}\left(1 + \frac{x}{1024} + \left(\frac{x}{1024}\right)^2 + \left(\frac{x}{1024}\right)^3 + \ldots\right) \qquad (8)$$

where $m+x=512$, and $128 \leq m \leq 511$. If we set $$a = \left(\frac{x}{1024}\right)^2,$$

then $$f = \frac{1}{1 + \frac{m}{512}} = \frac{1}{2}\left(1 + \frac{x}{1024} + \left(\frac{x}{1024}\right)^2 \left(1 + \frac{a}{1-a}\right)\right) \qquad (9)$$

$$= \frac{1}{2}\left(1 + \frac{x}{1024} + \left(\frac{x}{1024}\right)^2 \left(\frac{1}{1-a}\right)\right)$$

where a and x are defined above.

It can be seen that x, whose range is [1, . . . , 384], is smaller compared to the denominator 1024 and hence the efficiency improves considerably compared to the previous case. Now, a suitable value for a that will both simplify hardware implementation and reduce the error must be selected.

When x is 384 (its maximum value), a=0.3750 and $$\left(\frac{1}{1-a}\right) = 1.6.$$

The selection $$\left(\frac{1}{1-a}\right) = 1.5$$

can be easily implemented. In essence, Equation (9) becomes $$f = \left(1 + \frac{m}{512}\right)^{-1} \equiv \frac{1}{2}\left(1 + \frac{x}{1024} + 1.5\left(\frac{x}{1024}\right)^2\right) \quad (10)$$

$$= \frac{1}{2}\left(1 + \frac{x}{1024} + \left(\frac{x}{1024}\right)^2 + \frac{1}{2}\left(\frac{x}{1024}\right)^2\right) \quad (11)$$

and as a result, we have $$\left(1 + \frac{m}{512}\right)^{-1} \equiv \begin{cases} \frac{1}{2}\left(1 + \frac{x}{1024} + 1.5\left(\frac{x}{1024}\right)^2\right), & \text{if } m \geq 128 \text{ where } x = 512 - m \\ \left(1 - \frac{m}{512} + \left(\frac{m}{512}\right)^2\right), & \text{otherwise } (m < 128) \end{cases} \quad (12)$$

Figure 3:
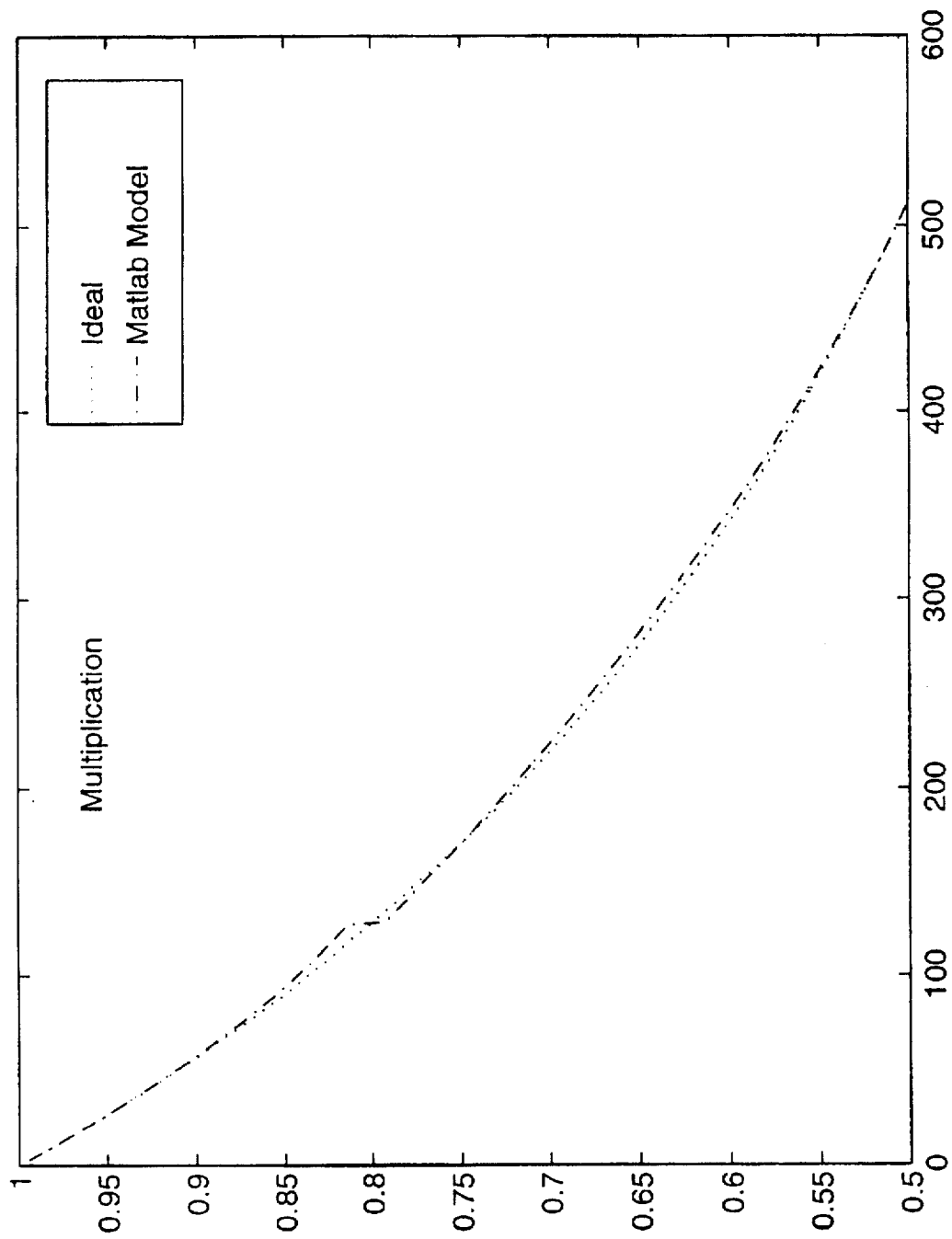
FIG. 3 is another graphical representation of ideal (dotted line) and approximated (dashed line) values of $ACR^{-1}$, with $1/(1+m/512)$ plotted as the ordinate and m plotted as the abscissa.

FIG. 3 graphically represents the approximation given by Equation (12) (dashed line) and the ideal value (dotted line). The maximum absolute error is 0.0122 yielding a relative error of 1.5262% at m=127, while the root mean square error is 0.00385.

The main disadvantage of the foregoing technique, in terms of implementation complexity, is that multiplication (which is both expensive and slow, from a hardware standpoint) is required to evaluate the second order terms (viz., $x^2$ and $m^2$) Secondly, the approximation does not truly upperbound the ideal over the entire range, because Equation (12) has been truncated by using a multiplication factor of 1.5 instead of 1.6 for x=384 for the quadratic term. This fact is exemplified in FIG. 3 near the m=128 region where the approximation is smaller in magnitude than the ideal. As will now be explained, these disadvantages can be overcome by using a piece-wise linear approximation model.

Piece-wise Linear Approximation

As is well known, a non-linear function $f(a)$, can be represented as a linear function over an infinitesimal interval $\Delta$. Thus, the quadratic function $f(a)=a^2$, may be represented as a sequence of linear approximations in order to simplify hardware computation and reduce the relative error.

Three ranges are used to approximate $f(a)$ for $a=[0, \ldots, 0.375]$. The partitions for each range are selected to be a fractional power of 2 (or a combination that can be represented in fractional powers of 2) in order to avoid a requirement to perform division or multiplication.

$$\text{Range 1: } 0 \leq \alpha \leq \frac{1}{8} \quad (13)$$

$$f(\alpha) = \frac{\alpha}{8}$$

$$\text{Range 2: } \frac{1}{8} \leq \alpha \leq \frac{1}{4} \quad (14)$$

$$f(\alpha) = \frac{3\alpha}{8} - \frac{1}{32} = \frac{\alpha}{4} + \frac{\alpha}{8} - \frac{1}{32}$$

$$\text{Range 3: } \frac{1}{4} \leq \alpha \leq \frac{1}{2} \quad (15)$$

$$f(\alpha) = \frac{3\alpha}{4} - \frac{1}{8} = \frac{\alpha}{2} + \frac{\alpha}{4} - \frac{1}{8}$$

Figure 4:
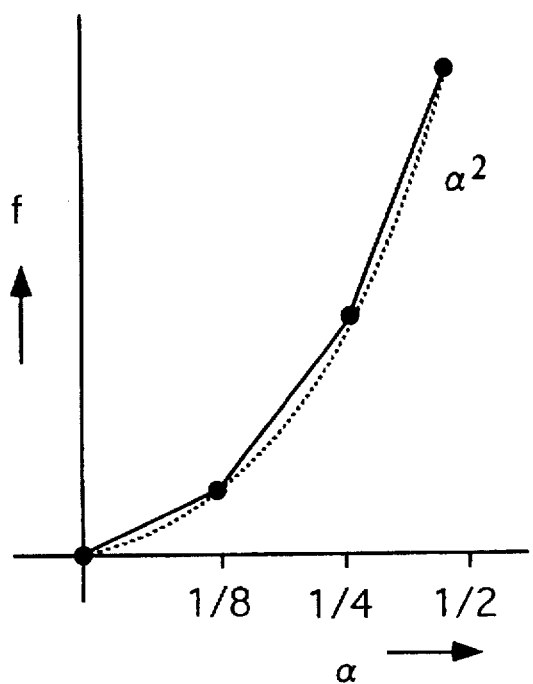
FIG. 4 depicts linear approximation of a quadratic function $f(a)$ over three ranges.

FIG. 4 graphically illustrates the use of three straight lines to approximate the quadratic function for the defined range. Note that the function value of the approximation is never less than the quadratic function's value. The maximum difference occurs exactly at the mid point of each range (e.g., $a=\frac{1}{16}$ for Range 1) while the minimum difference (of 0) occurs at the boundary points.

The above model can be adapted to the problem at hand, viz., to evaluate Equation (12). Observe that the range of a adequately covers both partitions i.e. for $m \geq 128$, we have $$\left(\frac{x}{1024} \leq 0.375\right)$$

and when $m \leq 127$, we have $$\left(\frac{x}{512} < 0.25\right).$$

Hence, the formula for computing the reciprocal becomes:

$$\left(1 + \frac{m}{512}\right)^{-1} = \begin{cases} \frac{1}{2}\left(1 + \frac{x}{1024} + 1.5\left(\frac{3x}{4 \times 1024} - \frac{1}{8}\right)\right), & \text{if } ((m \geq 128)\&\&(257 \leq x \leq 384)) \\ & \text{where } x = 512 - m \\ \frac{1}{2}\left(1 + \frac{x}{1024} + 1.5\left(\frac{3x}{8 \times 1024} - \frac{1}{32}\right)\right), & \text{if } ((m \geq 128)\&\&(129 \leq x \leq 256)) \\ \frac{1}{2}\left(1 + \frac{x}{1024} + 1.5\left(\frac{x}{8 \times 1024}\right)\right), & \text{if } ((m \geq 128)\&\&(x \leq 128)) \\ \left(1 - \frac{m}{512} + \left(\frac{3m}{8 \times 512} - \frac{1}{32}\right)\right), & \text{if } (65 \leq m \leq 127) \\ \left(1 - \frac{m}{512} + \left(\frac{m}{8 \times 512}\right)\right), & \text{if } (m \leq 64) \end{cases} \quad (16)$$

Figure 5:
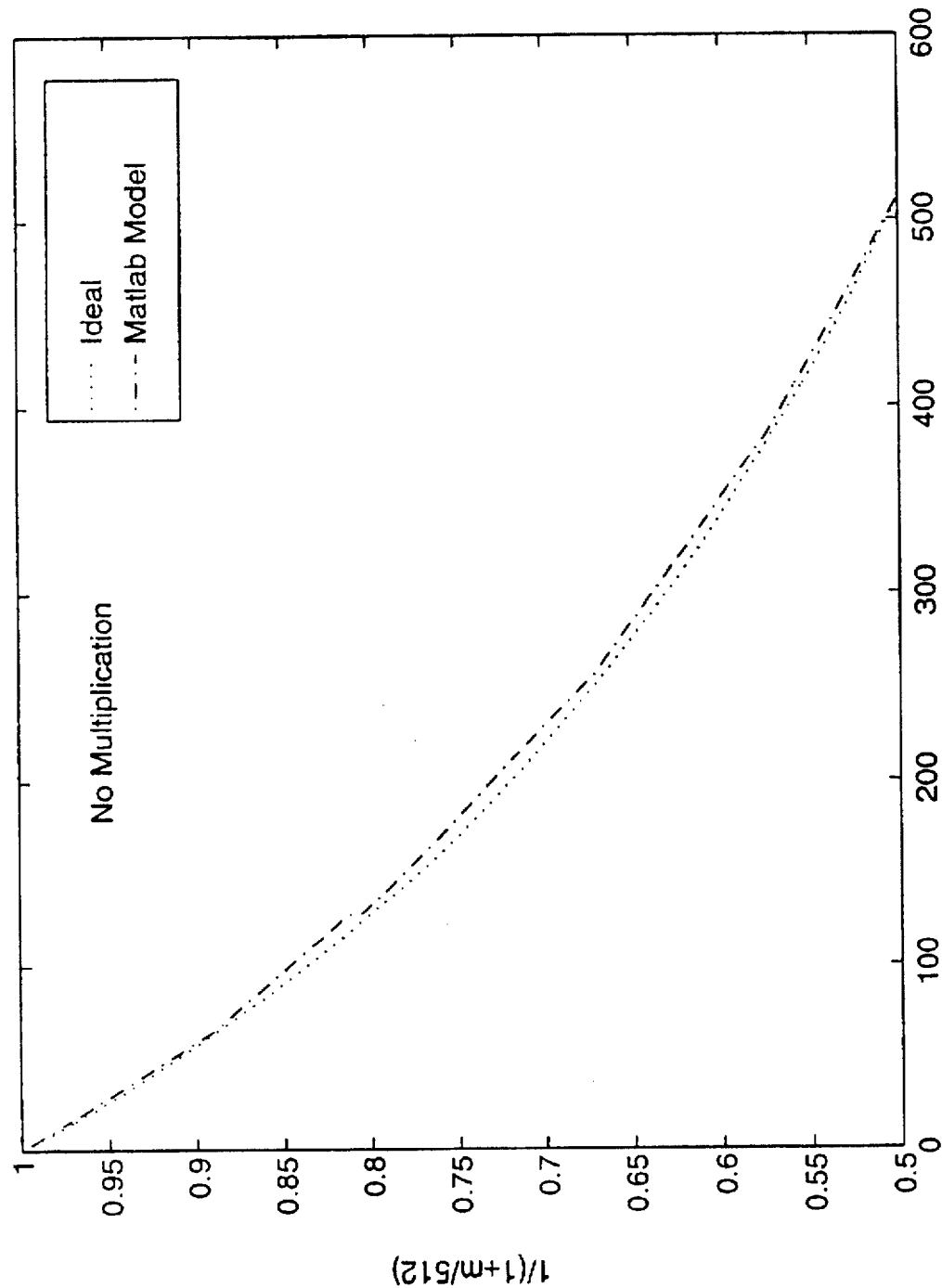
FIG. 5 is another graphical representation of ideal (dotted line) and approximated (dashed line) values of $ACR^-$, with $1/(1+m/512)$ plotted as the ordinate and m plotted as the abscissa.
Figure 6:
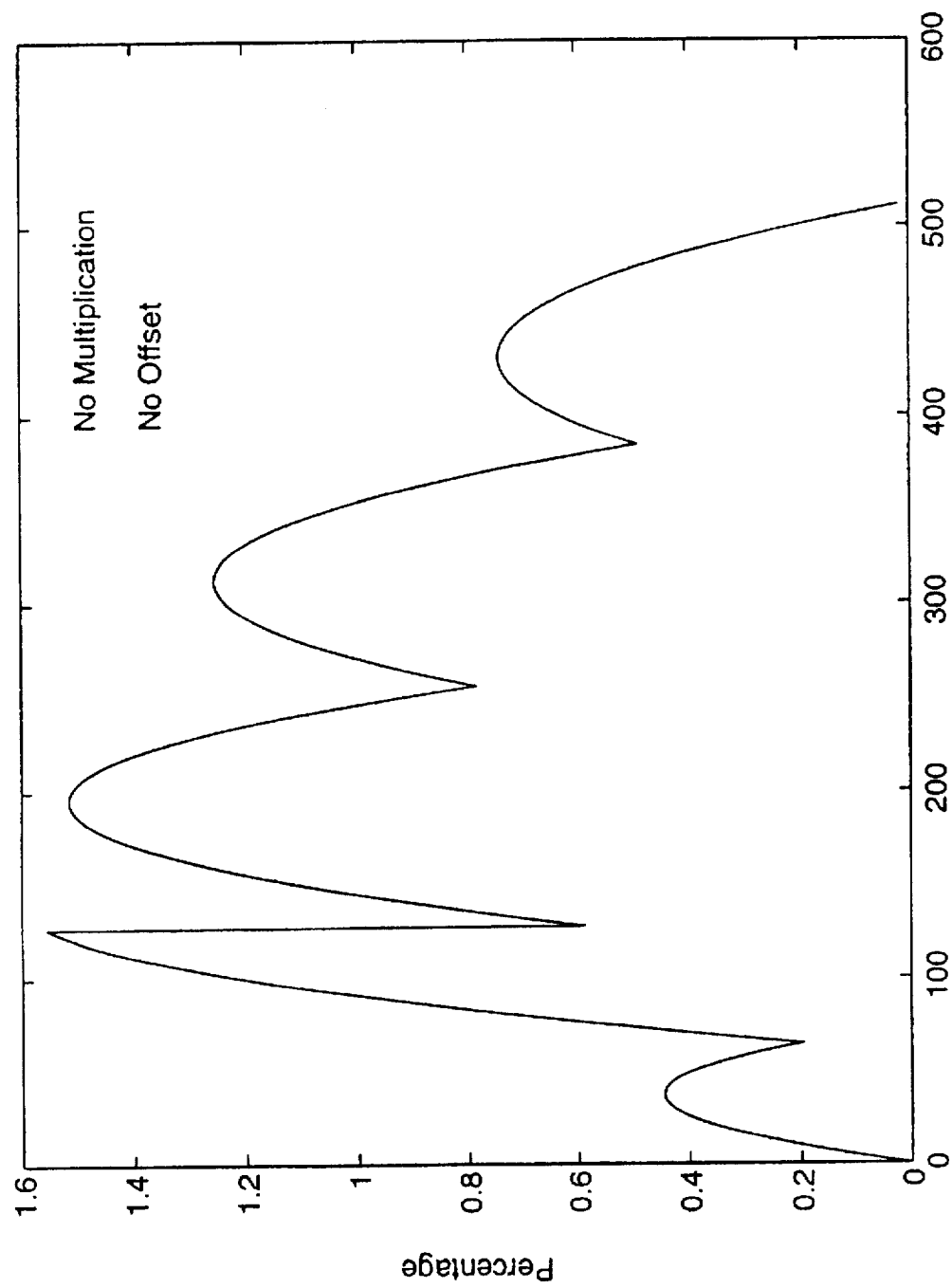
FIG. 6 is a graphical representation of an error function comparison of the ideal and approximated values plotted in FIG. 5.

FIG. 5 graphically depicts the approximation yielded by Equation (16) 2 0 (dashed lines) and also shows the ideal value (dotted lines). Note that the approximation lies above the ideal case for all values of $m \leq 511$. The maximum error is 0.0124687 at m=127, while the relative error is 1.556%. A plot of the error function is shown in FIG. 6.

The performance can be further refined by subtracting specific constants or offsets at the boundary points. The selected constants should be easily represented for a given bit-length and should be amenable to hardware implementation. The offsets tabulated in FIG. 13 were derived through numerical analysis of specific points and were converted to the nearest fractional representation (up to a 12-bit precision) wherever possible by considering their minimum values for the specified range, and were then integrated into Equation (16) by suitable mathematical manipulation. The main criteria used in selecting offsets are that the resultant function value should never be smaller than the ideal case, and that they should be amenable to easy hardware implementation.

The final formula incorporating the FIG. 13 offsets is given by:

$$\left(1+\frac{m}{512}\right)^{-1} = \begin{cases} \frac{1}{2}\left(1+\frac{x}{1024}+1.5\left(\frac{3x}{4\times 1024}-\frac{1}{8}\right)\right)+\Delta_3, & \text{if }((m\geq 128)\&\&(257\leq x\leq 384)) \\ & \text{where } x=512-m \\ \frac{1}{2}\left(1+\frac{x}{1024}+1.5\left(\frac{3x}{8\times 1024}-\frac{1}{32}\right)\right)+\Delta_4, & \text{if }((m\geq 128)\&\&(129\leq x\leq 256)) \\ \frac{1}{2}\left(1+\frac{x}{1024}+1.5\left(\frac{x}{8\times 1024}\right)\right), & \text{if }((m\geq 128)\&\&(x\leq 128)) \\ \left(1-\frac{m}{512}+\left(\frac{3m}{8\times 512}-\frac{1}{32}\right)\right)+\Delta_2, & \text{if }(97\leq m\leq 127) \\ \left(1-\frac{m}{512}+\left(\frac{3m}{8\times 512}-\frac{1}{32}\right)\right)+\Delta_1, & \text{if }(65\leq m\leq 96) \\ \left(1-\frac{m}{512}+\left(\frac{m}{8\times 512}\right)\right), & \text{if }(m\leq 64) \end{cases} \quad (17)$$

Figure 7:
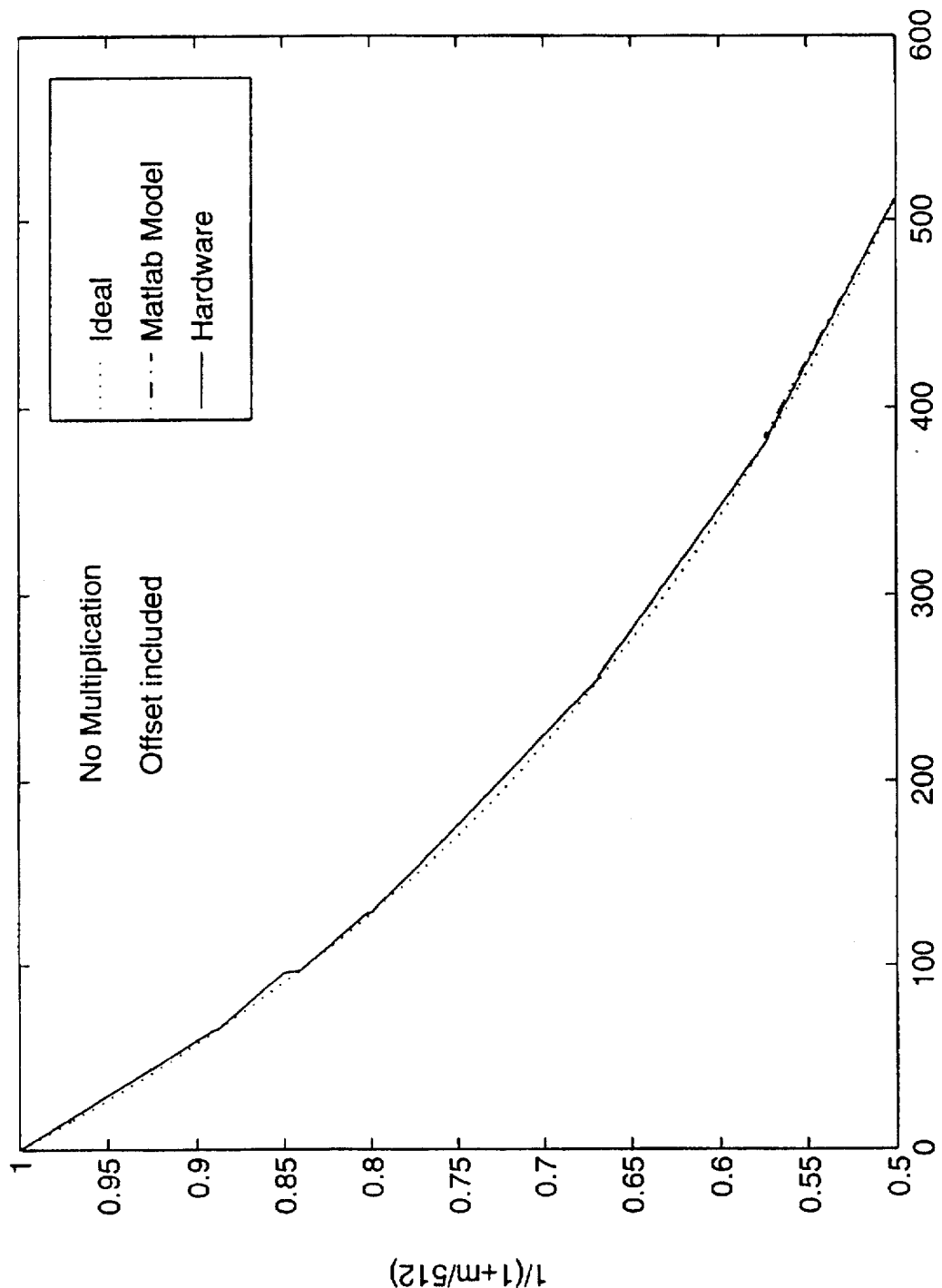
FIG. 7 is a graphical representation of ideal (dotted line), mathematical model-rendered (dashed line) and hardware model-rendered (solid line) values of $ACR^{-1}$, with $1/(1+m/512)$ plotted as the ordinate and m plotted as the abscissa.

FIG. 7 graphically depicts (dashed line) the approximation of the reciprocal rendered by Equation (17), taking into account the offsets described above.

Figure 8:
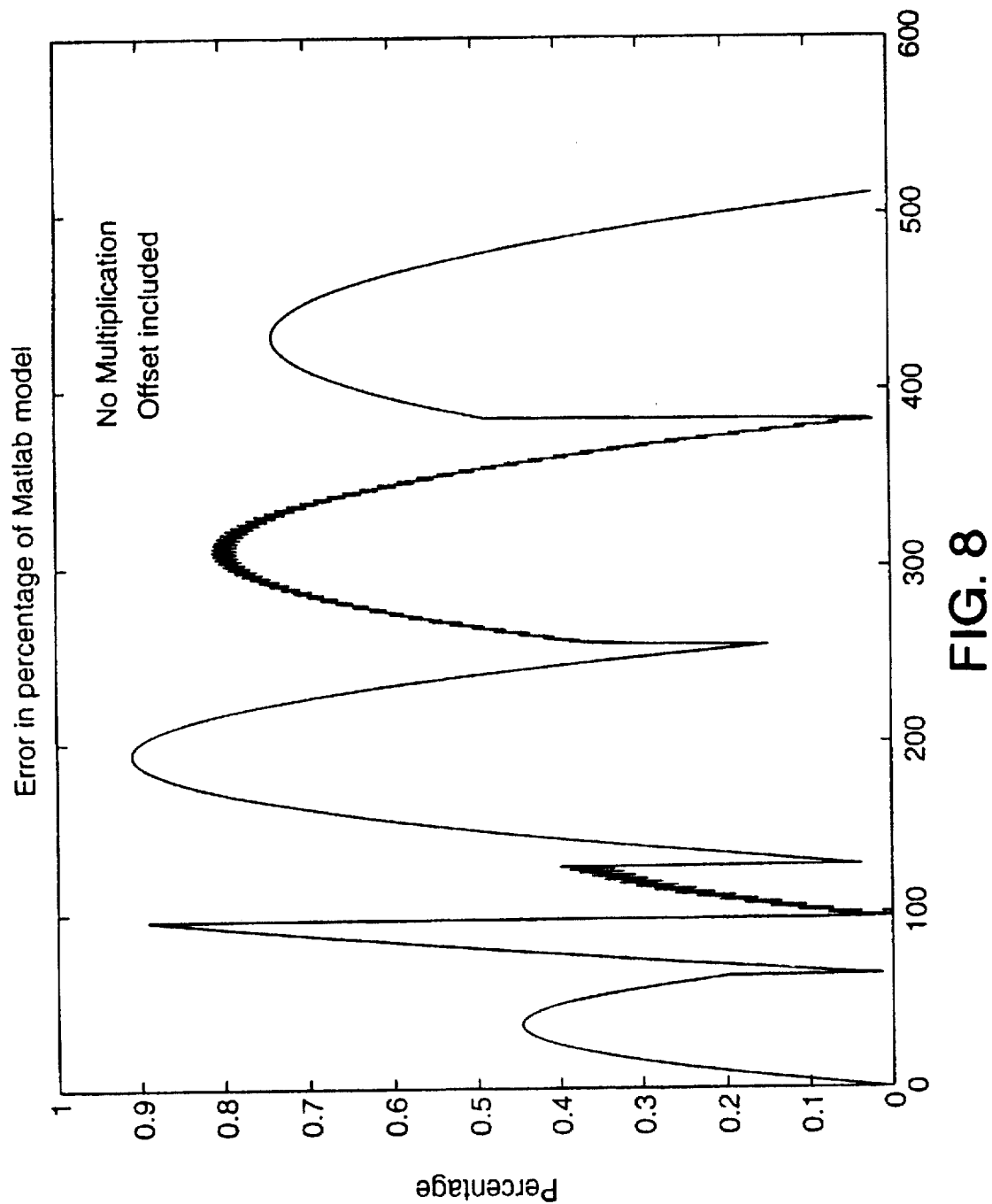
FIG. 8 is a graphical representation of percentage error in the mathematical model-rendered values plotted in FIG. 7.
Figure 9:
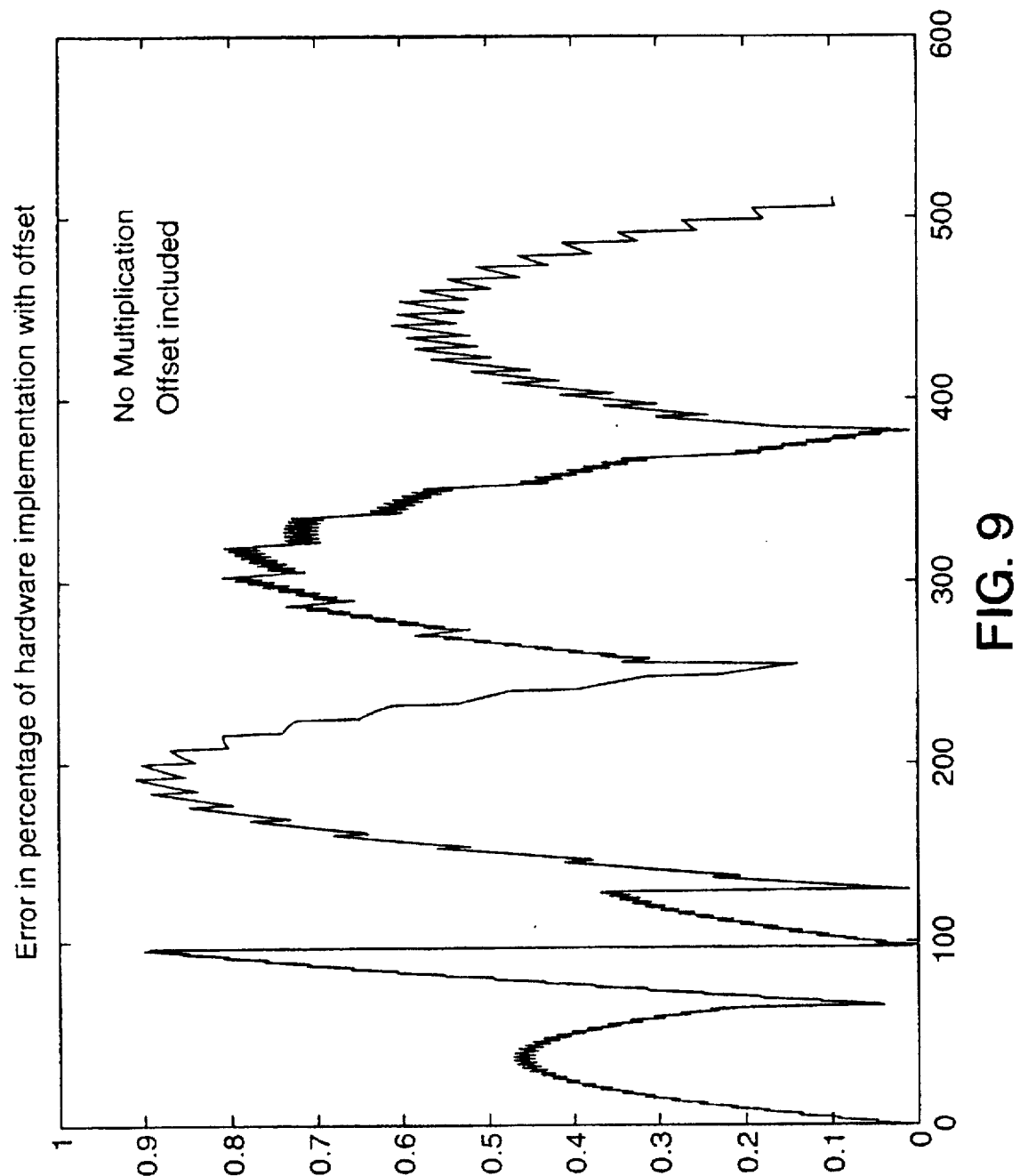
FIG. 9 is a graphical representation of percentage error in the hardware model-rendered values plotted in FIG. 7.

FIG. 7 also graphically depicts (solid line) the reciprocal value yielded by the hardware model described below. FIGS. 8 and 9 respectively depict the variation in error for the Equation (17) approximation and for the hardware model. Note that the hardware model is limited by the accuracy of the bit-representation selected (say 11-bits) as opposed to the potentially higher precision of a software model. However, the maximum error for the hardware model is only 0.007504 and the error relative to the ideal value is 0.9099% which is an improvement compared to the previous case.

Implementation

If it is assumed that the precision is limited to 11 bits, multiplication of Equation (17) by 2048 (i.e. $2^{11}$) eliminates most of the denominator terms and simplifies evaluation. The remaining fractional portions can be rounded/truncated to obtain a reasonable degree of accuracy.

Figure 10:
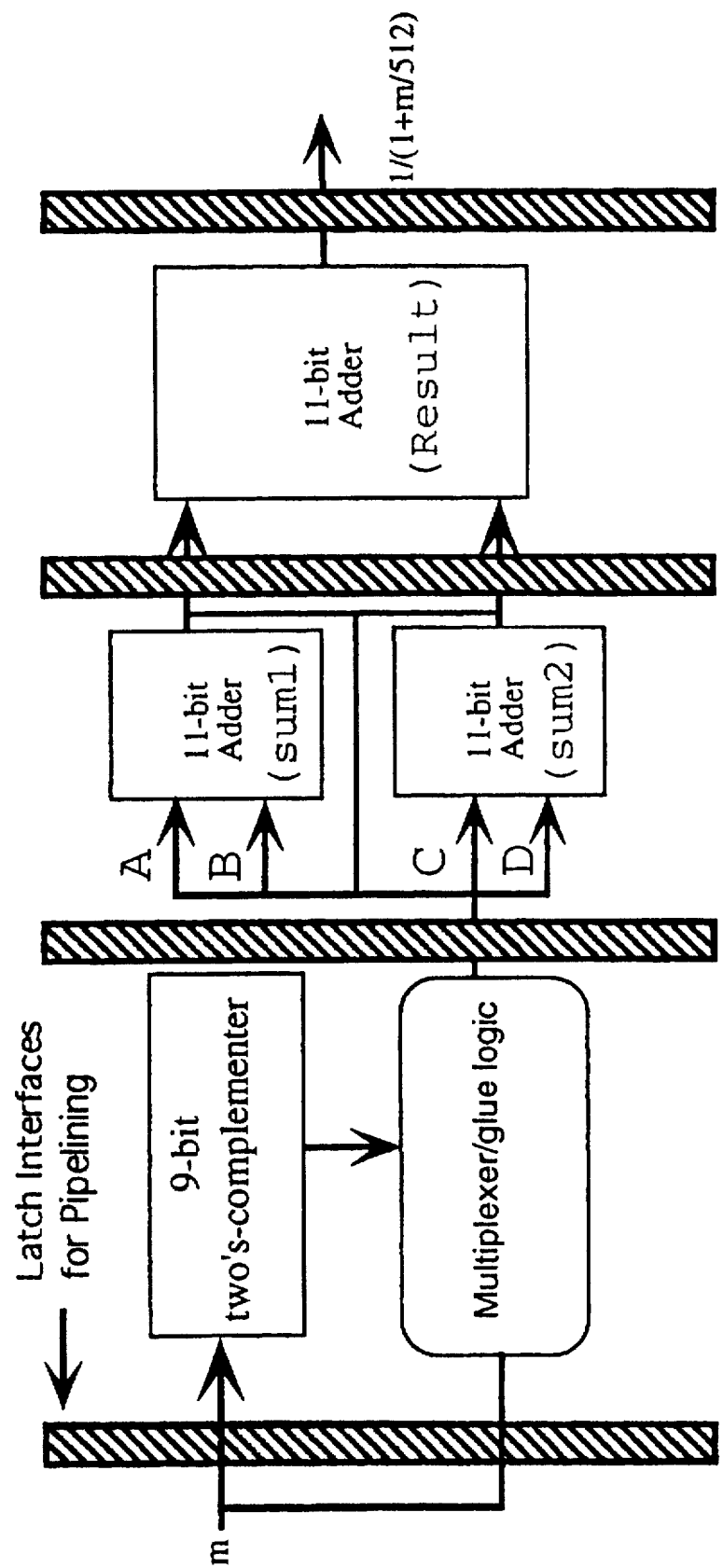
FIG. 10 is a block diagram depiction of a hardware unit for determining $ACR^{-1}$ in accordance with the invention.

FIG. 10 is a block diagram of the preferred hardware embodiment of the invention. The main functional units required for computation of the reciprocal are: one 9-bit two's complementer, three 11-bit adders, and glue logic for multiplexing/control. Latch interfaces may be provided for possible pipeline implementation.

Implementing Equation (16) involves two main partitions on m as discussed previously (Equation (12)): Case I: m<128 and Case II: m≥128; in addition to the calculation of x. Observe that x=512−m for m>0 is equivalent to the two's complement representation of m in 9-bits. Instead of using a subtractor for calculating x=512−m, only its two's complement is needed and therefore a 9-bit inverter/incrementer can be used. The special case m=0 is discussed below.

For each of Cases I and II, three more checks must be made on m or x to determine the appropriate range as given by Equation (17). Each of these checks will now be discussed in turn, first for Case 1: m<128.

a) m > 96

$$ACR^{-1}=1-\frac{m}{512}+\left(\frac{3m}{8\times 512}-\frac{1}{32}\right)+\Delta_2$$

-continued
$$=1-\frac{m}{512}+\left(\frac{3m}{8\times 512}-\frac{1}{32}\right)-\left(\frac{5}{512}\right)+\left(\frac{m\%2}{4096}\right)$$

Multiplication by 2048 yields:

$$ACR^{-1}=2048-4m+\frac{3m}{2}-84+\frac{m\%2}{2}=4(512-m)+$$

$$\frac{3m}{2}-84+\frac{m\%2}{2}$$

$$=4x+m+\frac{m}{2}-84+\frac{m\%2}{2}\text{ where }x=512-m.$$

Figure 11A:
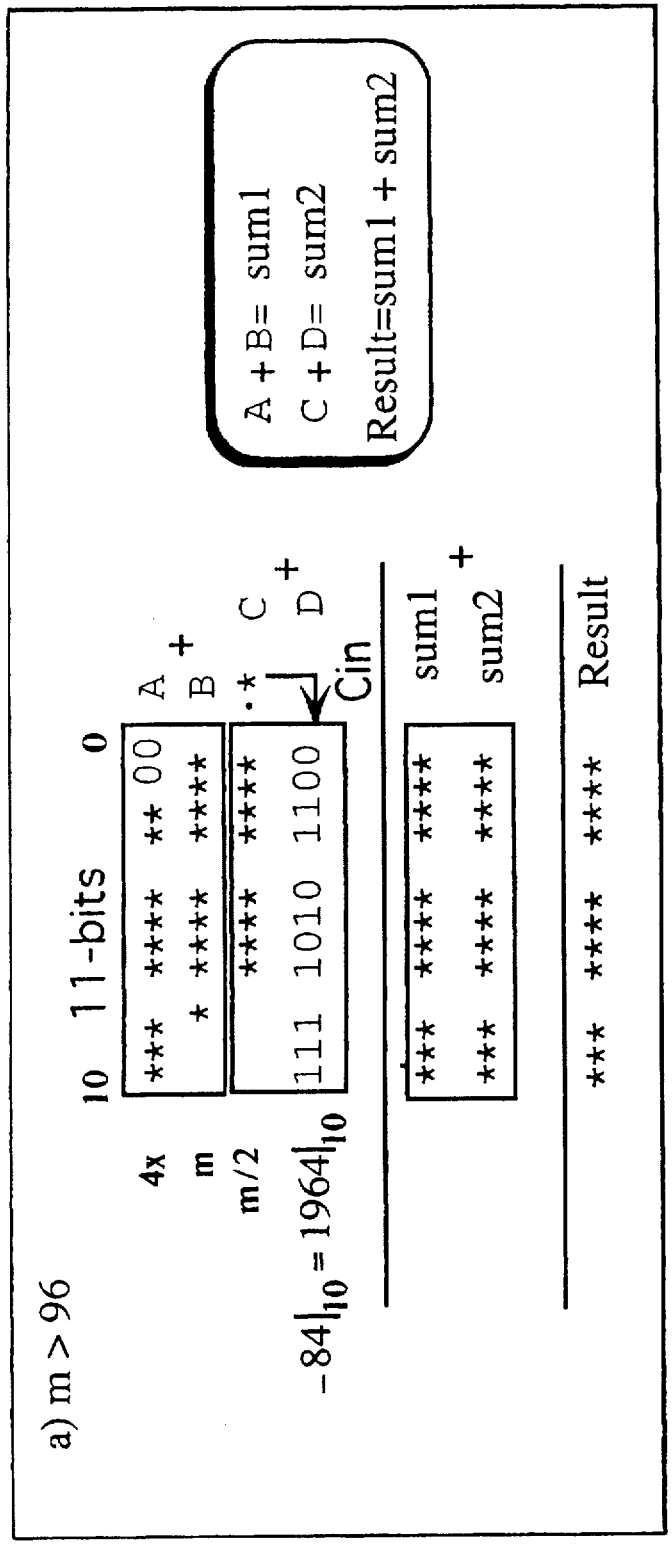
FIGS. 11 (a), 11 (b) and 11 (c) respectively depict bit groupings utilized in the hardware unit of FIG. 10 during determination of $ACR^{-1}$ for values of m, where: $96<m<128$; $64<m<96$; and, $m \leq 64$.

The twos complement of −84 is 1964 (as a 11-bit representation). Furthermore m%2 is 1 if m is odd and can be calculated easily by checking the least significant bit (LSB) of m. The bit groupings are shown in FIG. 11(a), where A=4x, B=m, $$C=\frac{m}{2}$$

and D=−84|$_{10}$ and the summation A+B+C+D is completed in two steps assuming A+B and C+D are executed in parallel as shown in FIG. 10. The carryin bit of the C+D adder is initialized with the LSB of m to round the result when m%2 is 1.

b) m > 64

$$ACR^{-1}=1-\frac{m}{512}+\left(\frac{3m}{8\times 512}-\frac{1}{32}\right)+\Delta_1$$

-continued $$= 1 - \frac{m}{512} + \left( \frac{3m}{8 \times 512} - \frac{1}{32} \right) - \frac{1}{512}$$

Scaling by 2048 yields:

$$ACR^{-1} = 2048 - 4m + \frac{3m}{2} - 68 = 4(512 - m) + \frac{3m}{2} - 68$$

$$= 4x + m + \frac{m}{2} - 68 \text{ (twos complement of } -68 \text{ is } 1980\text{)}$$

The bit groupings are shown in FIG. 11(b) and follow the similar pattern explained above in relation to FIG. 11(a).

c) $m \leq 64$ $$ACR^{-1} = 1 - \frac{m}{512} + \frac{m}{8 \times 512}.$$

As before multiplying by 2048 yields $$ACR^{-1} = 4(512 - m) + \frac{m}{2} = 4x + \frac{m}{2} \quad (18)$$

with the bit groupings being shown in FIG. 11(c).
Special Case: m=0

When m=0, the reciprocal of ACR is 1. Observe that for the entire range of m i.e. ($0 \leq m \leq 511$), the reciprocal varies between $1 \geq m > 0.5$, implying that the most significant bit in the output should always be a '1'. Hence, by clearing all the output bits, one may imply that the reciprocal is 1 in a negative logic (i.e. if m__out=0 then the reciprocal is 1). This result is implicitly yielded by the computation for m=0, since the two's complement of 0 is 0 and consequently x=0.

Therefore, the output of Case I (c) will be 0 (see Equation (18)).

Case II: $m \geq 128$ will now be discussed.

a) $x > 256$ $$ACR^{-1} = \frac{1}{2} \left( 1 + \frac{x}{1024} + 1.5 \left( \frac{3x}{4 \times 1024} - \frac{1}{8} \right) \right) + \Delta_3$$

$$= \frac{1}{2} + \frac{x}{2048} + \frac{3}{4} \left( \frac{3x}{4 \times 1024} - \frac{1}{8} - \frac{12}{2048} \right)$$

$$2048 \times ACR^{-1} = 1024 + x + \frac{9x}{8} - 201 = 823 + 2x + \frac{x}{8}.$$

Here, $A = 2x$ and $B = \frac{x}{8}$ yielding sum 1 while sum2 is initialized to 823. The bit groupings are shown in FIG. 11(c).

b) $x > 128$ $$ACR^{-1} = \frac{1}{2} \left( 1 + \frac{x}{1024} + 1.5 \left( \frac{3x}{8 \times 1024} - \frac{1}{32} \right) \right) + \Delta_4$$

$$= \frac{1}{2} + \frac{x}{2048} + \frac{3}{4} \left( \frac{3x}{8 \times 1024} - \frac{1}{32} - \frac{1}{256} + \left( \frac{x\%2}{4096} \right) \right)$$

Scaling by 2048 yields:

$$ACR^{-1} = 1024 + x + \frac{9x}{16} - 54 +$$

$$\frac{3}{4} \left( \frac{x\%2}{2} \right) = 970 + \frac{x}{2} + \frac{x}{16} + \frac{3}{8} (x\%2)$$

The bit groupings are shown in FIG. 12(b).

c) $x \leq 128$ $$ACR^{-1} = \frac{1}{2} + \frac{x}{2048} + \frac{3}{4} \left( \frac{x}{8 \times 1024} \right)$$

$$2048 \times ACR^{-1} = 1024 + x + \frac{3x}{16} = 1024 + x + \frac{x}{8} + \frac{x}{16}$$

Figure 12C:
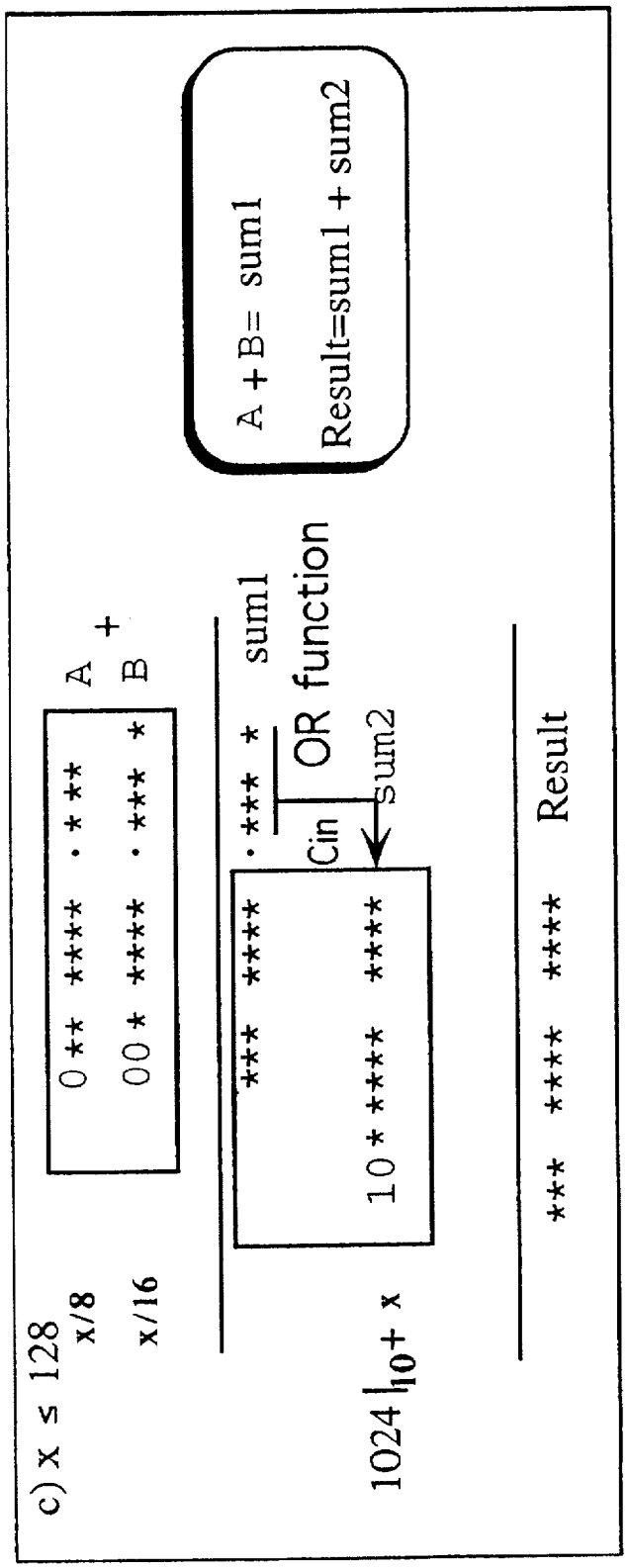

The bit groupings are shown in FIG. 12(c).

It can thus be seen that, in general, the invention involves piece-wise linear approximation of equation (12), thereby eliminating the need for multiplication in evaluating quadratic terms. The invention accordingly facilitates scheduling of cell transmission over an asynchronous transfer mode communication channel having a system clock frequency $f$ and an allowed cell rate ACR. A selected cell is scheduled for transmission at a time T relative to the transmission time $T_0$ of a cell transmitted immediately prior to said selected cell, where $T = T_0 + (ACR^{-1}) * f$.

Alternative Implementations

Other possible hardware implementations of the invention include actual hardware division or table-lookup techniques. But, implementation of high speed division requires expensive hardware and usually involves multiplication/array addition. Table look-up techniques may require circuits of comparable or greater complexity than the circuitry required for hardware division. For a Read Only Memory (ROM) implementation, a total of 512×11 -bits=704 bytes is required. The area for such a ROM in the case of a 0.6 micron 5 V, high density CMOS technology implementation is approximately 1400 gates. By comparison, the algorithm proposed above has been coded in VHDL (without pipelining) and the resultant combinational circuit has been synthesized on a 0.6 micron, CMOS library using a logic synthesizer (the VHDL code appears in the attached Appendix). The resultant circuit was analyzed using a static timing analyzer. The statistics of the implementation are summarized below in Table 1.

TABLE 1

| Area/timing data of the implemented circuit | |
|---|---|
| Gate Equivalent | Maximum Delay |
| ~660 (no timing constraints) | ~23 ns |
| ~890 (with timing constraints) | ~13 ns |

It can thus be seen that the invention provides a simple, extremely accurate and computationally inexpensive means for computing the reciprocal, without ever yielding a result which exceeds the actual cell rate. The invention can be implemented in a hardware circuit with full parallelism, utilizing only one 9-bit two's complementer and three 11-bit adders with some glue logic. The percentage of error is 0.901% or equivalently the ACR computed from the reciprocal is accurate to 99.108% of the ideal value over the whole dynamic range. The invention is also amenable to pipelining with a speed-up factor of at least 3.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

APPENDIX

```
-- FUNCTION :
--
-- This hardware module approximates the reciprocal of ACR
-- when the mantissa is in the range (0 <= m <= 511)
-- Specifically, it computes 1/(1+ m/512) using the binomial
-- expansion and quadratic approximation techniques
-- upto a 11-bit precision.
-- GENERICS:
--
-- INPUT PORT DESCRIPTION :
--
-- m       : a 9-bit mantissa.
--
--
-- OUTPUT PORT DESCRIPTION :
--
-- m_out   : the reciprocal of (1+ m/512) as a 11-bit number
-- NOTES :
-- a) For 1 <= m <= 511, the output, m_out
--              is in the range 1 > m_out > 0.5.
-- b) For m=0, the output is cleared i.e, m_out=0
--              implying that the reciprocal is 1 (negative --
           logic)
-- -----------------------------------------------

LIBRARY IEEE;
LIBRARY compass_lib;
USE ieee.std_logic_1164.ALL;
USE compass_lib.compass.ALL;
USE compass_lib.stdcomp.ALL;
ENTITY one_by_m IS
    PORT( m    : IN std_logic_vector(8 DOWNTO 0) :=
                                  (OTHERS => 'Z');
          m_out  : OUT std_logic_vector(10 DOWNTO 0)
    );
END one_by_m;
ARCHITECTURE rtl OF one_by_m IS
    CONSTANT width : integer :=11;
BEGIN
    p1:
    PROCESS (m)
        VARIABLE result  : std_logic_vector(width-1 DOWNTO 0) :=
                                                   (OTHERS
=> '0');
        VARIABLE sum1 : std_logic_vector(width-1 DOWNTO 0) :=
                                                   (OTHERS
=> '0');
        VARIABLE sum2 : std_logic_vector(width-1 DOWNTO 0) :=
                                                   (OTHERS
=> '0');
        VARIABLE x : std_logic_vector(8 DOWNTO 0) := (OTHERS
=> '0');
    BEGIN
        x := (NOT(m)) + '1';       -- x=512- m is equivalent to the
                                   -- Two's complement of m in 9-bits
                                   -- for m >0.
        IF (to_integer(m) >= 128) THEN    -- 1024 mode (II part)
            IF (to_integer(x) > 256) THEN   -- 257 <= x <= 384
              -- result = 1/2 + x/(2*1024) + 9*x/(4*8*1024)
                                          -3*268/(4*2048) to
              -- result = 1024 + 2*x + x/8 - 201 which is equivalent
              --                                              to
              -- result = 823.00 + 2*x + x/8
              sum1 := (extend(x,10) & '0') +
                              extend(x(8 DOWNTO 3), width);
              sum2 := to_stdlogicvector(823,width);
              result :=sum1 + sum2 ;
            ELSIF (to_integer(x) > 128) THEN   -- 129 <= x <= 256
              -- result = 1/2 + x/(2*1024) + 9*x/(4*8*1024) -27/1024
                                          + (1/2048)
              --                          if x modulo 2 = 1;
              -- result = 1024 + x + x/2 + x/16 -54 + carryin after
                                                   decimal pt
              -- result = 970 + x + x/2 + x/16
              sum1 := extend(x,width) + to_stdlogicvector(970,width);
              sum2 := (x & x(0) & x(0)) + extend(x(8 DOWNTO 1), width)
                                          + x(0);
              result := sum1 + extend(sum2(10 DOWNTO 3), width);
            ELSE                              -- 1 <= x <= 128
              -- result = 1/2 + x/(2*1024) + 3*x/(4*8*1024) scaled to
              -- result = 1024 + x/2 + x/8 + x/16
              sum2 := ("10" & x);
              sum1 := (extend(x,10) & '0') +
                              extend(x(8 DOWNTO 1), width);
              result := sum2 + (("0000") & sum1(10 DOWNTO 4)) +
                              (sum1(3) OR sum1(2) OR sum1(1) or sum1(0));
            END IF ;
        ELSE        -- 512 mode (I part)
          IF (to_integer(m) > 96) THEN
                                   -- 97 <= m <= 127
              -- result := 1 - m/512 + 3*m/(8*512) - 21/512
              --                       (+ 1/2048)
              --              if m modulo 2=1
              -- result := 4*(512 - m) + 3*m/2 -84 + m(0);
              sum1 := (x & "00") + extend(m,width);
              sum2 := extend(m(8 DOWNTO 1),width) +
                              to_stdlogicvector(1964,width) + m(0);
              -- 1964 refers to 2's complement of 84 in 11-bits
              result := sum1 + sum2;
          ELSIF (to_integer(m) > 64) THEN    -- 65 <= m <= 96
              -- result := 1 - m/512 + 3*m/(8*512)
              -- result := 1 - m/512 + 3*m/(8*512) - 17/512
              -- result := 4*(512 - m) + 3*m/2 - 68;
              sum1 := (x & "00") + extend(m,width);
              sum2 := extend(m(8 DOWNTO 1),width) +
                              to_stdlogicvector(1980,width) + m(0);
              -- 1980 refers to 2's complement of 68 in 11-bits
              -- m(0) is added to for left over fractions
              result := sum1 + sum2;
          ELSE                       -- 0 <= m <= 64 case
              -- result := 1 - m/512 + m/(8*512) which is scaled to
              -- result := 4*(512 - m) + m/2
              -- result := 4*x + m/2
              -- Note: If m=0, then x (2's comp) is 0,
              -- and result=0;
              sum1 := to_stdlogicvector(0,width);
              sum2 := to_stdlogicvector(0,width);
              sum1 := (x & "00");
              sum2 := extend(m(8 DOWNTO 1),width);
              result := sum1 + sum2 + m(0);
              -- m(0) is added to account for left over fractions
              -- to be on the safe side
          END IF ;
        END IF;
        m_out <= result;
    END PROCESS p1;
END rtl;
```

What is claimed is:

1. A method of scheduling cell transmission over an asynchronous transfer mode communication channel, said channel characterized by a clock frequency $f$ and an allowed cell rate A(R expressed as a floating point number having a mantissa m and an exponent e, where $0 \leq m \leq 511$, $0 \leq e \leq 31$ and $ACR=(1+m/512)*2^3$, said method requiring determination of the reciprocal $ACR^{-1}$ of said allowed cell rate and comprising the steps of:

(a) if $m \geq 128$ evaluating the reciprocal of the mantissa portion (1+m/512) by piece-wise linear approximation of the function:

$$\frac{1}{2}\left(1 + \frac{512-m}{1024} + 1.5\left(\frac{512-m}{1024}\right)^2\right);$$

(b) if m<128 evaluating the reciprocal of said mantissa portion by piece-wise linear approximation of the function:

$$\left(1 - \frac{m}{512} + \left(\frac{m}{512}\right)^2\right); \text{and,}$$

(c) scheduling a selected cell for transmission at a time T relative to the transmission time $T_0$ of a cell transmitted immediately prior to said selected cell, where $$T = T_0 + (ACR^{-1}) * f.$$

2. A method of scheduling cell transmission over an asynchronous transfer mode communication channel, said channel characterized by a clock frequency $f$ and an allowed cell rate ACR expressed as a floating point number having a mantissa m and an exponent e, where $0 \leq m \leq 511, 0 \leq e \leq 31$ and $ACR=(1+m/512)*2^3$, said method requiring determination of the reciprocal $ACR^{-1}$ of said allowed cell rate and comprising the steps of:

(a) if m=0 setting the mantissa reciprocal portion 1/(1+m/512)=1;

(b) if $0 < m \leq 64$:
  (i) deriving sum1=4*(512−m) as an 11 bit binary representation;
  (ii) deriving sum2=m/2 as an 11 bit binary representation;
  (iii) deriving sum1+sum2 as an 11 bit binary representation;
  (iv) setting said mantissa reciprocal portion=1 if sum1+sum2=0 and otherwise setting said mantissa reciprocal portion=sum1+sum2;

(c) if $64 < m \leq 96$:
  (i) deriving A=4*(512−m) as an 11 bit binary representation;
  (ii) deriving B=m as an 11 bit binary representation;
  (iii) deriving sum1=A+B as an 11 bit binary representation;
  (iv) deriving C=m/2 as an 11 bit binary representation;
  (v) deriving D=1980 as an 11 bit binary representation;
  (vi) deriving sum2=C+D as an 11 bit binary representation;
  (vii) deriving said mantissa reciprocal portion=sum1+sum2 as an 11 bit binary representation;

(d) if $96 < m < 128$:
  (i) deriving A=4*(512−m) as an 11 bit binary representation;
  (ii) deriving B=m as an 11 bit binary representation;
  (iii) deriving sum1=A+B as an 11 bit binary representation;
  (iv) deriving C=m/2 as an 11 bit binary representation;
  (v) deriving D=1964 as an 11 bit binary representation;
  (vi) deriving sum2=C+D as an 11 bit binary representation;
  (vii) deriving said mantissa reciprocal portion=sum1+sum2 as an 11 bit binary representation;

(e) if $m \geq 128$ and $257 \leq (512-m) \leq 384$:
  (i) deriving A=2*(512−m) as an 11 bit binary representation;
  (ii) deriving B=(512−m)/8 as an 11 bit binary representation;
  (iii) deriving sum1=A+B as an 11 bit binary representation;
  (iv) deriving sum2=823 as an 11 bit binary representation;
  (v) deriving said mantissa reciprocal portion=sum1+sum2 as an 11 bit binary representation;

(f) if $m \geq 128$ and $(512-m) \leq 256$:

(i) deriving A=(512−m)/2+⅛*((512−m) modulo 2) as an 11 bit binary representation;
  (ii) deriving B=(512−m)/16 as an 11 bit binary representation;
  (iii) deriving sum1=A+B as an 11 bit binary representation;
  (iv) deriving C=970 as an 11 bit binary representation;
  (v) deriving D=(512−m) as an 11 bit binary representation;
  (vi) deriving sum2=C+D as an 11 bit binary representation;
  (vi) deriving said mantissa reciprocal portion=sum1+sum2 as an 11 bit binary representation;

(g) if $m \geq 128$ and $1 \leq (512-m) \geq 128$:
  (i) deriving A=(512−m)/8 as an 11 bit binary representation;
  (ii) deriving B=(512−m)/16 as an 11 bit binary representation;
  (iii) deriving sum1=A−B as an 11 bit binary representation;
  (iv) deriving sum2=1024 as an 11 bit binary representation;
  (v) deriving said mantissa reciprocal portion=sum1+sum2 as an 11 bit binary representation;

(h) scheduling a selected cell for transmission at a time T relative to the transmission time $T_0$ of a cell transmitted immediately prior to said selected cell, where $$T = T_0 + (ACR^{-1}) * f.$$

3. A method of scheduling cell transmission over an asynchronous transfer mode communication channel, said channel characterized by a clock frequency $f$ and an allowed cell rate ACR expressed as a floating point number having a mantissa m and an exponent e, where $0 \leq m \leq 511, 0 \leq e \leq 31$ and $ACR=(1+m/512)*2^3$, said method requiring determination of the reciprocal $ACR^{-1}$ of said allowed cell rate and comprising the steps of:

(a) if m=0 then setting the mantissa reciprocal portion 1/(1+m/512)=1;

(b) if $0 \leq m \leq 64$ then:
  (i) if the two's complement of m=0 then setting said mantissa reciprocal portion=1;
  (ii) if the two's complement of m≠0 then setting said mantissa reciprocal portion=4*(512−m)+m/2;

(c) if $64 < m < 96$ then setting said mantissa reciprocal portion=4*(512−m)+m+m/2−68;

(d) if $96 < n < 128$ then setting said mantissa reciprocal portion=4*(512−m)+m+m/2−84+m%2/2;

(e) if $m \geq 128$ and $247 \leq (512-m) \leq 384$ then setting said mantissa reciprocal portion=2*(512−m)+(512−m)/8+823;

(f) if $m \geq 128$ and $129 \leq (512-m) \leq 256$ then setting said mantissa reciprocal portion=(512−m/2+⅛*((512−m) mod 2) 4 (512−m)/16+970;

(g) if $m \geq 128$ and $1 \leq (512-m) \leq 128$ then setting said mantissa reciprocal portion 1/(1+m/512)=(512−m)+(512−m)/8 (512−m)16+1024; and, (h) scheduling a selected cell for transmission at a time 7 relative to the transmission time $T_0$ of a cell transmitted immediately prior to said selected cell, where $$T = T_0 + (ACR) * f.$$

4. Apparatus for approximating the reciprocal $ACR^{-1}$ of an allowed cell rate ACR in scheduling cell transmission over an asynchronous transfer mode communication channel, said allowed cell rate ACR expressed as a floating point number having a mantissa m and an exponent e, where $0 \leq m \leq 511$, $0 \leq e \leq 31$ and $ACR=(1+m/512)*2^3$, said apparatus comprising:

(a) a two's complementer for receiving a binary representation of said mantissa m and for producing a two's complement representation thereof;

(b) a first adder for receiving first and second binary representations of selected functions of said two's complement representation of said mantissa m and for producing a first binary summation representation thereof;

(c) a second adder for receiving third and fourth binary representations of selected constants or selected functions of said two's complement representation of said mantissa 1n and for producing a second binary summation representation thereof; and, (d) a third adder for determining said reciprocal $ACR^{-1}$ as a binary summation representation of said first and second summation representations.

5. Apparatus as defined in claim 4, wherein:

(a) said floating point number further comprises a nine-bit mantissa and a 5-bit exponent;

(b) said two's complementer is a 9-bit two's complementer; and, (c) said first, second and third adders are 11-bit adders.

* * * * *